United States Patent
Treyer

(10) Patent No.: US 8,767,807 B2
(45) Date of Patent: Jul. 1, 2014

(54) METHOD AND DEVICE FOR TRANSMITTING OR RECEIVING A CLOCK SIGNAL AND COMMUNICATION SYSTEM COMPRISING SUCH DEVICE

(75) Inventor: Thomas Treyer, München (DE)

(73) Assignee: Nokia Siemens Networks Oy, Espoo (FI)

( * ) Notice: Subject to any disclaimer, the term of this patent is extended or adjusted under 35 U.S.C. 154(b) by 553 days.

(21) Appl. No.: 12/738,741

(22) PCT Filed: Oct. 14, 2008

(86) PCT No.: PCT/EP2008/063786
§ 371 (c)(1),
(2), (4) Date: Apr. 19, 2010

(87) PCT Pub. No.: WO2009/050162
PCT Pub. Date: Apr. 23, 2009

(65) Prior Publication Data
US 2010/0208843 A1    Aug. 19, 2010

(30) Foreign Application Priority Data
Oct. 19, 2007    (EP) .................................. 07020513

(51) Int. Cl.
*H04B 1/38* (2006.01)

(52) U.S. Cl.
USPC ........... 375/222; 375/260; 375/257; 370/254; 370/503; 370/241

(58) Field of Classification Search
USPC .......... 375/299, 316, 222; 370/254, 503, 241, 370/524
See application file for complete search history.

(56) References Cited

U.S. PATENT DOCUMENTS

| | | | | |
|---|---|---|---|---|
| 5,909,445 | A * | 6/1999 | Schneider | 370/468 |
| 6,556,592 | B1 | 4/2003 | Kasuya | |
| 6,640,094 | B1 | 10/2003 | Tabeta | |
| 8,068,430 | B2 * | 11/2011 | Geva et al. | 370/241 |
| 2001/0043568 | A1 * | 11/2001 | McHale et al. | 370/254 |
| 2005/0036540 | A1 | 2/2005 | Noma et al. | |

(Continued)

FOREIGN PATENT DOCUMENTS

| | | |
|---|---|---|
| EP | 0683579 A2 | 11/1995 |
| EP | 1073218 A2 | 1/2001 |

(Continued)

OTHER PUBLICATIONS

ITU-T 922.1 "Asymmetric Digital Subscriber Line (ADSL) Transceivers", Series G: Transmission Systems and Media, Digital Systems and Networks, Jun. 1999.

(Continued)

*Primary Examiner* — Eva Puente
(74) *Attorney, Agent, or Firm* — Laurence A. Greenberg; Werner H. Stemer; Ralph E. Locher

(57) ABSTRACT

A method and a device are provided for transmitting or receiving a clock signal. The method includes the step of transmitting or receiving at least two wave bands via a digital subscriber line, wherein a clock signal is conveyed via one of the at least two wave bands. The clock signal may be used for mobile clock synchronization.

10 Claims, 1 Drawing Sheet

(56) References Cited

U.S. PATENT DOCUMENTS

| | | | |
|---|---|---|---|
| 2006/0120443 A1* | 6/2006 | Cheng et al. | 375/222 |
| 2006/0227913 A1 | 10/2006 | Sedarat | |
| 2007/0189337 A1* | 8/2007 | Kim | 370/524 |
| 2011/0261842 A1* | 10/2011 | Beili et al. | 370/503 |

FOREIGN PATENT DOCUMENTS

| | | |
|---|---|---|
| EP | 1507397 A2 | 2/2005 |
| JP | 6085799 A | 3/1994 |
| JP | 2003163952 A | 6/2003 |
| WO | 0211383 A2 | 2/2002 |
| WO | 2006102065 A2 | 9/2006 |

OTHER PUBLICATIONS

ITU-T 992.3 "Asymmetric Digital Subscriber Line Transceivers 2 (ADSL2)", Series G: Transmission Systems and Media, Digital Systems and Networks, Jan. 2005.

ITU-T 992.5 "Asymmetric Digital Subscriber Line (ADSL) Transceivers—Extended Bandwidth ADSL2 (ADSL2+)", Series G: Transmission Systems and Media Digital Systems and Networks, Jan. 2005.

ITU-T 993.1 "Very High Speed Digital Subscriber Line Transceivers", Series G: Transmission Systems and Media, Digital Systems and Networks, Jun. 2004.

ITU-T 993.2 "Very high speed digital subscriber line transceivers 2 (VDSL2)", Series G: Transmission Systems and Media, Digital Systems and Networks, Feb. 2006.

* cited by examiner

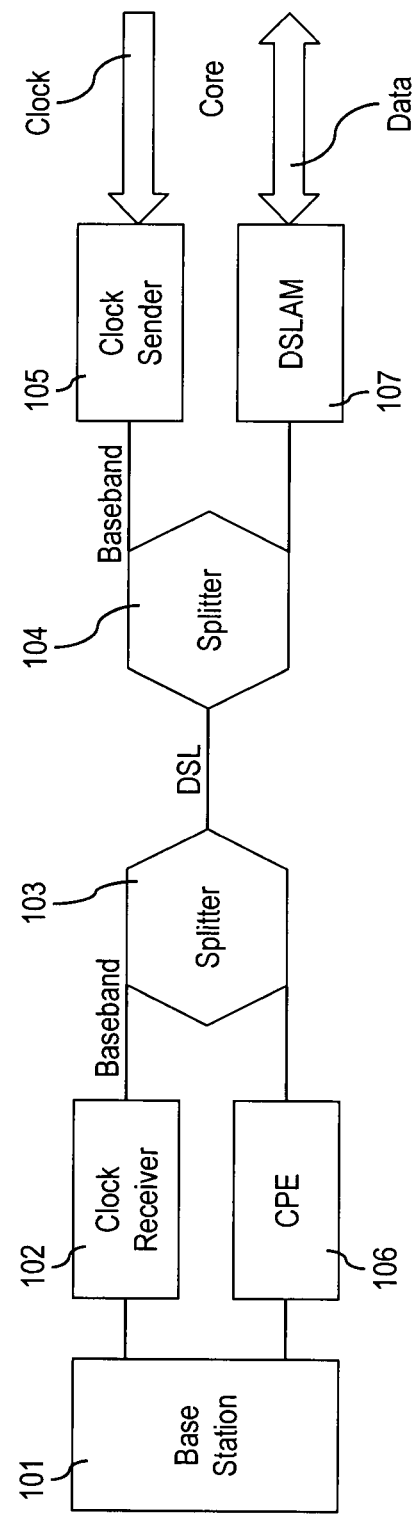

METHOD AND DEVICE FOR TRANSMITTING OR RECEIVING A CLOCK SIGNAL AND COMMUNICATION SYSTEM COMPRISING SUCH DEVICE

BACKGROUND OF THE INVENTION

Field of the Invention

The invention relates to a method and to a device for transmitting and/or receiving a clock signal and to a communication system comprising such a device.

DSL (Digital Subscriber Line) is a family of technologies that provide digital data transmission over the wires of a telephone access network. DSL technologies are often referred to as "xDSL", wherein "x" stands for various DSL variants.

Asymmetric Digital Subscriber Line (ADSL, ITU-T G.992.1) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

ADSL2 (ITU-T G.992.3) and ADSL2plus (ITU-T G.992.5) are variants of ADSL, both providing better performance compared to basic ADSL.

VDSL (Very high speed DSL, ITU-T G.993.1) as well as VDSL2 (Very high speed DSL 2, ITU-T G.993.2) are xDSL technologies providing even faster data transmission over a single twisted pair of wires. This is mainly achieved by using a larger frequency range.

xDSL technologies exploit the existing infrastructure of copper wires that were originally designed for plain old telephone service (POTS). They can be deployed from central offices (COs), from, e.g., fiber-fed cabinets preferably located near the customer premises, or within buildings.

Base stations for mobile networks (e.g., in the area of GSM or UMTS) are preferably connected via microwave links or SDH links to a core network.

Both, the SDH and the microwave links are TDM links that are capable of transporting both data and clock information via the same link. Such clock information is required in order to synchronize a base station with the core network.

Depending on the mobile technology, clock frequency synchronization and/or clock phase synchronization is necessary. Frequency synchronization is a pre-requisite for roaming between radio cells as well as phase synchronization and it is further required to enable time-division multiplex of different base stations.

With an increasing bandwidth demand of future mobile base stations, bandwidth restrictions of today's microwave links are further stressed. On the other hand, however, broadband SDH E1 links are expensive for operators or network providers.

DSL links are capable of transporting data via packets, but do not provide any clock synchronization. Hence, important clock synchronization demands of mobile network base stations cannot be fulfilled by the existing DSL technology.

BRIEF SUMMARY OF THE INVENTION

The problem to be solved is to overcome the disadvantages as set forth above and in particular to provide an efficient approach that allows mobile backhaul clock synchronization via digital subscriber line technology.

This problem is solved according to the features of the independent claims. Further embodiments result from the depending claims.

In order to overcome this problem, a method is provided for transmitting a clock signal comprising the step:
- transmitting at least two wave bands via a digital subscriber line, wherein a clock signal is conveyed via one of the at least two wave bands.

The problem is also overcome by a method for receiving a clock signal comprising the step:
- receiving at least two wave bands via a digital subscriber line, wherein a clock signal is conveyed via one of the at least two wave bands.

This approach allows advantageously to utilize commonly available xDSL connections to supply in particular mobile base stations with data as well as clock information. In other words, the infrastructure for residential Internet access can be re-used for mobile backhaul.

In an embodiment, the clock signal is conveyed over a narrow band.

In particular a connection used for POTS and/or ISDN can be utilized for said clock signal.

In another embodiment, the other of the at least two wave bands is used for data transmission. Such data transmission may in particular be a broadband data transmission or a broadband connection.

In a further embodiment, a base station is synchronized by said clock signal.

Said base station is in particular a mobile backhaul base station that is connected to the core network via a xDSL connection.

In a next embodiment, the digital subscriber line is one of the following:
- an Asymmetric Digital Subscriber Line according to ADSL2/2plus standards or
- a very high speed Digital Subscriber Lines according to VDSL/VDSL2 standards.

The problem stated above is also solved by a device for transmitting a clock signal comprising a processor unit that is equipped and/or arranged such that the method as described herein is executable on said processor unit.

The problem stated above is further solved by a device for receiving a clock signal comprising a processor unit that is equipped and/or arranged such that the method as described herein is executable on said processor unit.

According to an embodiment, the device for receiving a clock signal is connected to a base station, in particular to a mobile base station.

According to yet another embodiment, the device is connected to a splitter.

The problem stated supra is further solved by a communication system comprising the device as described herein.

Embodiments of the invention are shown and illustrated in the following figure:

BRIEF DESCRIPTION OF THE DRAWING

The FIGURE of the drawing shows how to utilize a DSL connection to connect a (mobile) base station to a core network, wherein data transfer is provided via a broadband portion and a clock signal transfer is provided via a narrowband portion of the DSL connection.

DESCRIPTION OF THE INVENTION

Currently, DSL technology uses splitters at both ends of the DSL to transport two frequency ranges over a twisted-pair cable. A base frequency band is utilized for POTS/ISDN and a higher frequency band is used for DSL data transmission itself. The base frequency band is commonly used to provide a POTS or ISDN service to the subscriber, such service being independent from the DSL service.

Base stations for mobile networks do not use POTS or ISDN. Therefore, the base band is not used in mobile backhaul applications. The approach provided herewith allows utilizing the base band of an xDSL connection to transmit a narrow band clock signal (e.g., 64 kHz). A clock sender is thereby independent from a DSLAM, and a clock receiver is independent from a DSL-CPE.

Preferably, the approach provided largely utilizes existing components. Details are depicted in the figure of the drawing. A Clock signal is provided to a Clock Sender 105 and further conveyed via a Baseband to a Splitter 104. Data from the Core network is input to a DSLAM 107 and further conveyed to the Splitter 104. Both, Clock signal and Data are conveyed via a digital subscriber line DSL to a Splitter 103, separating both signals, conveying the baseband clock signal to a Clock Receiver 102 and the Data received to a CPE 106. The Clock Receiver 102 provides the Clock signal for synchronization purposes to a Base Station 101, wherein Data are conveyed via the CPE to the Base Station 101.

Preferably, the Clock Sender 105 comprises a sinusoidal clock and the Clock Receiver 102 comprises a crystal clock reference.

It is in particular an advantage of this approach that an existing DSL aggregation can be used for mobile backhaul, and no modification is required for the DSL and splitter equipment.

ABBREVIATIONS

CPE Customer Premises Equipment
DSL Digital Subscriber Line
ISDN Integrated Services Data Network
POTS Plain Old Telephony line
SDH Synchronous Digital Hierarchy
TDM Time Division Multiplex

The invention claimed is:

1. A method for transmitting data and a clock signal for a base station for mobile networks via a copper wire using at least two frequency bands, which comprises the steps of:
   utilizing a frequency band commonly used for Digital Subscriber Line (DSL) for transmitting said data;
   utilizing a frequency band commonly used to provide Plain Old Telephone Service (POTS) for transmitting said clock signal transfer; and
   wherein the base station is synchronized by the clock signal.

2. The method according to claim 1, wherein the data transmission is performed using a digital subscriber line selected from the group consisting of an asymmetric digital subscriber line according to ADSL2/2plus standards and a very high speed digital subscriber line according to VDSL/VDSL2 standards.

3. A method for receiving data and a clock signal for a base station for mobile networks via a copper wire using at least two frequency bands, which comprises the steps of:
   utilizing a frequency band commonly used for Digital Subscriber Line (DSL) for transmitting said data; and
   utilizing a frequency band commonly used to provide Plain Old Telephone Service (POTS) for transmitting said clock signal;
   receiving said data at a Customer Premises Equipment (CPE) and receiving said clock signal at a clock receiver; and
   synchronizing the base station with the clock signal.

4. The method according to claim 3, wherein the data transmission is performed using a digital subscriber line selected from the group consisting of an asymmetric digital subscriber line according to ADSL2/2plus standards and a very high speed digital subscriber line according to VDSL/VDSL2 standards.

5. A device for transmitting data and a clock signal for a base station for mobile networks via a copper wire using at least two frequency bands, the device comprising:
   a processor unit programmed to transmit said data utilizing a frequency band commonly used for Digital Subscriber Line (DSL) and said clock signal utilizing a frequency band commonly used to provide Plain Old Telephone Service (POTS);
   wherein the base station is synchronized by the clock signal.

6. The device according to claim 5, further comprising a splitter connected to said processor unit.

7. A communication system wherein data and a clock signal for a mobile base station are transmitted via a copper wire using at least two frequency bands, comprising:
   a device for transmitting said data and said clock signal, the device including a processor unit programmed to transmit said data utilizing a frequency band commonly used for Digital Subscriber Line (DSL) and said clock signal utilizing a frequency band commonly used to provide Plain Old Telephone Service (POTS);
   wherein the mobile base station is synchronized by the clock signal.

8. A device for receiving data and a clock signal for a base station for mobile networks via a copper wire using at least two frequency bands, the device comprising:
   a processor unit programmed to receive said data utilizing a frequency band commonly used for Digital Subscriber Line (DSL) and said clock signal utilizing a frequency band commonly used to provide Plain Old Telephone Service (POTS);
   wherein the base station is synchronized by the clock signal.

9. The device according to claim 8, further comprising a splitter connected to said processor unit.

10. A communication system wherein data and a clock signal for a base station for mobile networks is transmitted via a copper wire using at least two frequency bands, comprising:
    a device for transmitting said data and said clock signal, the device including a processor unit programmed to transmit said data utilizing a frequency band commonly used for Digital Subscriber Line (DSL) and said clock signal utilizing a frequency band commonly used to provide Plain Old Telephone Service (POTS); and
    a device for receiving said data and said clock signal, the device including a processor unit programmed to receive said data utilizing the frequency band commonly used for Digital Subscriber Line (DSL) and the clock signal utilizing the frequency band commonly used to provide Plain Old Telephone Service (POTS);
    wherein the base station is synchronized by the clock signal.

* * * * *